US009680301B2

(12) United States Patent
Johnson et al.

(10) Patent No.: US 9,680,301 B2
(45) Date of Patent: Jun. 13, 2017

(54) MASTER-SLAVE ARCHITECTURE FOR CONTROLLING OPERATION OF PHOTOVOLTAIC POWER PLANTS

(71) Applicant: SunPower Corporation, San Jose, CA (US)

(72) Inventors: Lars Johnson, Concord, CA (US); William B. Peter, Richmond, CA (US); Robert Johnson, Mill Valley, CA (US)

(73) Assignee: SunPower Corporation, San Jose, CA (US)

( * ) Notice: Subject to any disclaimer, the term of this patent is extended or adjusted under 35 U.S.C. 154(b) by 1182 days.

(21) Appl. No.: 13/658,562

(22) Filed: Oct. 23, 2012

(65) Prior Publication Data

US 2013/0106196 A1    May 2, 2013

Related U.S. Application Data

(60) Provisional application No. 61/552,345, filed on Oct. 27, 2011.

(51) Int. Cl.
*H02J 1/00* (2006.01)
*H02J 3/18* (2006.01)
(Continued)

(52) U.S. Cl.
CPC ............ *H02J 1/00* (2013.01); *H02J 3/1842* (2013.01); *H02J 3/383* (2013.01); *H02J 3/50* (2013.01);
(Continued)

(58) Field of Classification Search
CPC ......... H02J 1/00; H02J 3/383; Y10T 307/707; Y02E 10/563
(Continued)

(56) References Cited

U.S. PATENT DOCUMENTS 5,268,832 A   12/1993  Kandatsu
5,614,801 A    3/1997  Miramonti
(Continued)

FOREIGN PATENT DOCUMENTS

JP      2006-320149 A   11/2006
WO    WO2011/020124 A2   2/2011

OTHER PUBLICATIONS

SMA America, LLC—Sunny Central 500CP / 630CP / 720CP / 760CP 1800 CP, High performance comes standard, 2010 Inter Solar Award, pp. 1-6 [retrieved on Feb. 12, 2011], Retrieved from the internet: http://us.pv-contractor.com/us_store/index.php/us_us/aitdownloadablefiles/download/aitfile/aitfile_id/26255/.
(Continued)

*Primary Examiner* — Jared Fureman
*Assistant Examiner* — Emmanuel R Dominique
(74) *Attorney, Agent, or Firm* — Okamoto & Benedicto LLP

(57) ABSTRACT

A photovoltaic power plant with master-slave control architecture. The photovoltaic power plant includes slave plant controllers, with each slave plant controller controlling operation of photovoltaic inverters that convert direct current generated by solar cells to alternating current suitable for delivery to a utility power grid at a point of interconnection (POI). A master plant controller controls and coordinates the operation of the slave plant controllers. The master plant controller generates a global inverter real or reactive power setpoint, which is provided to each slave plant controller. In each slave plant controller, the global set point is processed to generate individual inverter real or reactive power setpoints that are provided to corresponding photovoltaic inverters controlled by that slave plant controller. A photovoltaic inverter generates an output based on
(Continued)

received individual inverter setpoint to achieve a desired real power, voltage or power factor.

25 Claims, 7 Drawing Sheets

(51) Int. Cl.
H02J 3/38 (2006.01)
H02J 3/50 (2006.01)
(52) U.S. Cl.
CPC ............. *Y02E 10/563* (2013.01); *Y02E 40/22* (2013.01); *Y10T 307/707* (2015.04)
(58) Field of Classification Search
USPC .......................................................... 307/82
See application file for complete search history.

(56) References Cited

U.S. PATENT DOCUMENTS

| | | | |
|---|---|---|---|
| 5,870,297 A | 2/1999 | Dahler et al. | |
| 6,633,823 B2 | 10/2003 | Bartone et al. | |
| 7,095,220 B2 | 8/2006 | Kernahan | |
| 7,135,956 B2 | 11/2006 | Bartone et al. | |
| 7,183,667 B2 | 2/2007 | Colby et al. | |
| 7,660,135 B2 | 2/2010 | Fang | |
| 7,884,492 B2 | 2/2011 | Xiong et al. | |
| 7,925,552 B2 | 4/2011 | Tarbell et al. | |
| 2007/0252716 A1* | 11/2007 | Burger .................. | H02M 7/493 340/635 |
| 2009/0020151 A1 | 1/2009 | Fornage | |
| 2009/0038668 A1 | 2/2009 | Plaisted | |
| 2009/0080226 A1 | 3/2009 | Fornage | |
| 2009/0160259 A1 | 6/2009 | Naiknaware et al. | |
| 2009/0283129 A1 | 11/2009 | Foss | |
| 2010/0116325 A1 | 5/2010 | Nikoonahad | |
| 2010/0134076 A1 | 6/2010 | Cardinal et al. | |
| 2010/0208501 A1 | 8/2010 | Matan et al. | |
| 2010/0277002 A1 | 11/2010 | Folts et al. | |
| 2010/0286836 A1 | 11/2010 | Shaver, II et al. | |
| 2010/0309692 A1 | 12/2010 | Chisenga et al. | |
| 2011/0032734 A1 | 2/2011 | Melanson | |
| 2011/0170222 A1 | 7/2011 | Fornage | |
| 2011/0232714 A1* | 9/2011 | Bhavaraju ............... | H02J 3/385 136/244 |
| 2011/0264289 A1* | 10/2011 | Sawyer ............. | H01L 31/02021 700/287 |
| 2011/0304215 A1* | 12/2011 | Avrutsky ................ | H02M 1/42 307/82 |
| 2012/0042588 A1* | 2/2012 | Erickson, Jr. ..... | H01L 31/02021 52/173.3 |
| 2012/0049637 A1* | 3/2012 | Teichmann ............... | H02J 3/26 307/82 |
| 2012/0055530 A1 | 3/2012 | Ger et al. | |
| 2012/0091817 A1* | 4/2012 | Seymour ................. | H02J 3/383 307/82 |
| 2012/0235498 A1 | 9/2012 | Johnson et al. | |
| 2012/0326511 A1 | 12/2012 | Johnson et al. | |
| 2013/0018516 A1* | 1/2013 | Chee ....................... | H02J 3/383 700/287 |
| 2013/0046416 A1* | 2/2013 | Osako ....................... | G05F 1/67 700/298 |

OTHER PUBLICATIONS

SMA America, LLC—Sunny Central Inverter user manual, Version 1.2., pp. 1-44 [retrieved on Feb. 22, 2011], Retrieved from the Internet: Shttp://www.dcpower-systems.com/uploads/products/25038_2.pdf.

International Search Report and Written Opinion of the International Searching Authority for Application No. PCT/US2012/061851, Jan. 22, 2013, 9 sheets.

Extended European Search Report for Application No. EP 12 84 4166, Mar. 3, 2015, 6 sheets.

* cited by examiner

MASTER-SLAVE ARCHITECTURE FOR CONTROLLING OPERATION OF PHOTOVOLTAIC POWER PLANTS

CROSS-REFERENCE TO RELATED APPLICATION

This application claims the benefit of U.S. Provisional Patent Application No. 61/552,345, filed Oct. 27, 2011, which is incorporated herein by reference in its entirety.

TECHNICAL FIELD

Embodiments of the subject matter described herein relate generally to photovoltaic power plants.

BACKGROUND

Photovoltaic power plants employ photovoltaic systems to generate electricity from solar radiation. A photovoltaic system may comprise arrays of solar panels, with each solar panel comprising interconnected solar cells. A solar cell includes P-type and N-type diffusion regions. Solar radiation impinging on the solar cell creates electrons and holes that migrate to the diffusion regions, thereby creating voltage differentials between the diffusion regions. In a backside contact solar cell, both the diffusion regions and the metal contact fingers coupled to them are on the backside of the solar cell. The contact fingers allow an external electrical circuit to be coupled to and be powered by the solar cell.

A photovoltaic inverter converts direct current generated by the solar cells to alternating current suitable for coupling to a power grid at a point of interconnection (POI). The output of the photovoltaic power plant at the POI, such as voltage, reactive power, real power, and power factor, are controlled to be within a range of specified values to meet requirements. Embodiments of the present invention pertain to a master-slave architecture for controlling the operation of the photovoltaic power plant to deliver photovoltaic power plant output at the POI or other delivery node.

BRIEF SUMMARY

In one embodiment, a photovoltaic power plant comprises a plurality of slave plant controllers, each slave plant controller in the plurality of slave plant controllers being configured to adjust a setpoint of each of a plurality of photovoltaic inverters controlled by the slave plant controller, the setpoint setting an output of a corresponding photovoltaic inverter provided to a point of interconnection (POI) of the photovoltaic power plant to a utility power grid, each of the plurality of photovoltaic inverters being configured to convert direct current generated by a plurality of solar cells to alternating current. The photovoltaic power plant further comprises a master plant controller controlling operation of the plurality of slave plant controllers, the master plant controller being configured to detect an output of the photovoltaic power plant at the POI to the utility power grid, and to control operation of the plurality of slave plant controllers to adjust setpoints of corresponding photovoltaic inverters based on the detected output of the photovoltaic power plant at the POI to the utility power grid.

In another embodiment, a method of controlling operation of a photovoltaic power plant includes controlling operation of a first plurality of photovoltaic inverters using a first slave plant controller, the first slave plant controller adjusting a setpoint of each photovoltaic inverter in the first plurality of photovoltaic inverters to adjust an output of each photovoltaic inverter in the first plurality of photovoltaic inverters, each photovoltaic inverter in the first plurality of photovoltaic inverters converting direct current generated by a first plurality of solar cells to alternating current for delivery to a point of interconnection (POI) of the photovoltaic power plant to a utility power grid. The operation of a second plurality of photovoltaic inverters is controlled using a second slave plant controller, the second slave plant controller adjusting a setpoint of each photovoltaic inverter in the second plurality of photovoltaic inverters to adjust an output of each photovoltaic inverter in the second plurality of photovoltaic inverters, each photovoltaic inverter in the second plurality of photovoltaic inverters converting direct current generated by a second plurality of solar cells to alternating current for delivery to the POI. An output of the photovoltaic power plant is measured at the POI. Operation of the first and second slave plant controllers is controlled using a master plant controller, the master plant controller controlling the first and second slave plant controllers to adjust setpoints of photovoltaic inverters in the first and second pluralities of photovoltaic inverters based on the measured output of the photovoltaic power plant at the POI.

In another embodiment, a method of controlling operation of a photovoltaic power plant includes installing a first plant controller of a photovoltaic power plant, the first plant controller being configured to control operation of a first plurality of photovoltaic inverters that convert direct current generated by a first plurality of solar cells to alternating current. The first plant controller is operated to generate an output of the photovoltaic power plant at a point of interconnection (POI) to a utility power grid. After the first plant controller has been operating to generate the output of the photovoltaic power plant at the POI to the utility power grid for at least a period of time, a second plant controller of the photovoltaic power plant is installed, the second plant controller being configured to control operation of a second plurality of photovoltaic inverters that convert direct current generated by a second plurality of solar cells to alternating current. A master plant controller is installed to control operation of the first and second plant controllers. Operation of the first and second plant controllers is controlled using the master plant controller, the master plant controller controlling the first and second plant controllers to adjust setpoints of photovoltaic inverters in the first and second pluralities of photovoltaic inverters based on a measured output of the photovoltaic power plant at the POI.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
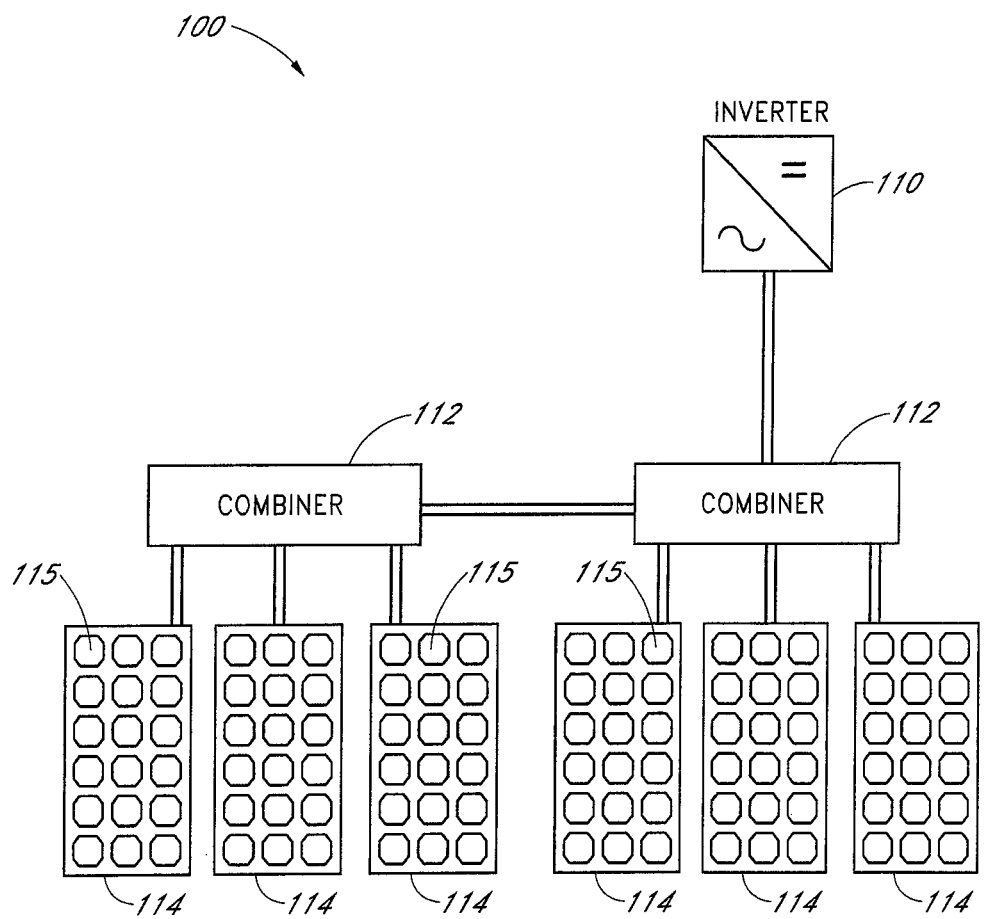
FIG. 1 schematically shows components of a photovoltaic power plant 100 in accordance with an embodiment of the present invention.

FIG. 1 schematically shows components of a photovoltaic power plant 100 in accordance with an embodiment of the present invention. The components of the photovoltaic power plant 100 shown in the example of FIG. 1 include a plurality of combiner boxes 112, a plurality of solar panels 114, and a photovoltaic inverter 110. A photovoltaic power plant may include a plurality of photovoltaic inverters 110 but only one is shown in FIG. 1 for clarity of illustration. A solar panel 114 comprises electrically connected solar cells mounted on the same frame. In one embodiment, each solar panel 114 comprises a plurality of serially-connected backside contact solar cells 115. Other types of solar cells including front contact solar cells may also be employed. Only some of the backside contact solar cells 115 have been labeled in FIG. 1 for clarity of illustration.

A photovoltaic string comprises a plurality of serially-connected solar panels 114 as in FIG. 1. A group of solar panels 114 is electrically connected to a combiner box 112, where the solar panels 114 are connected in series. The combiner boxes 112 may be electrically connected such that all solar panels 114 in the photovoltaic string are serially-connected. The output of the photovoltaic string is electrically connected to the inverter 110, which converts direct current (DC) generated by the solar cells 115 to alternating current (AC) suitable for delivery to a utility power grid, for example.

Figure 2:
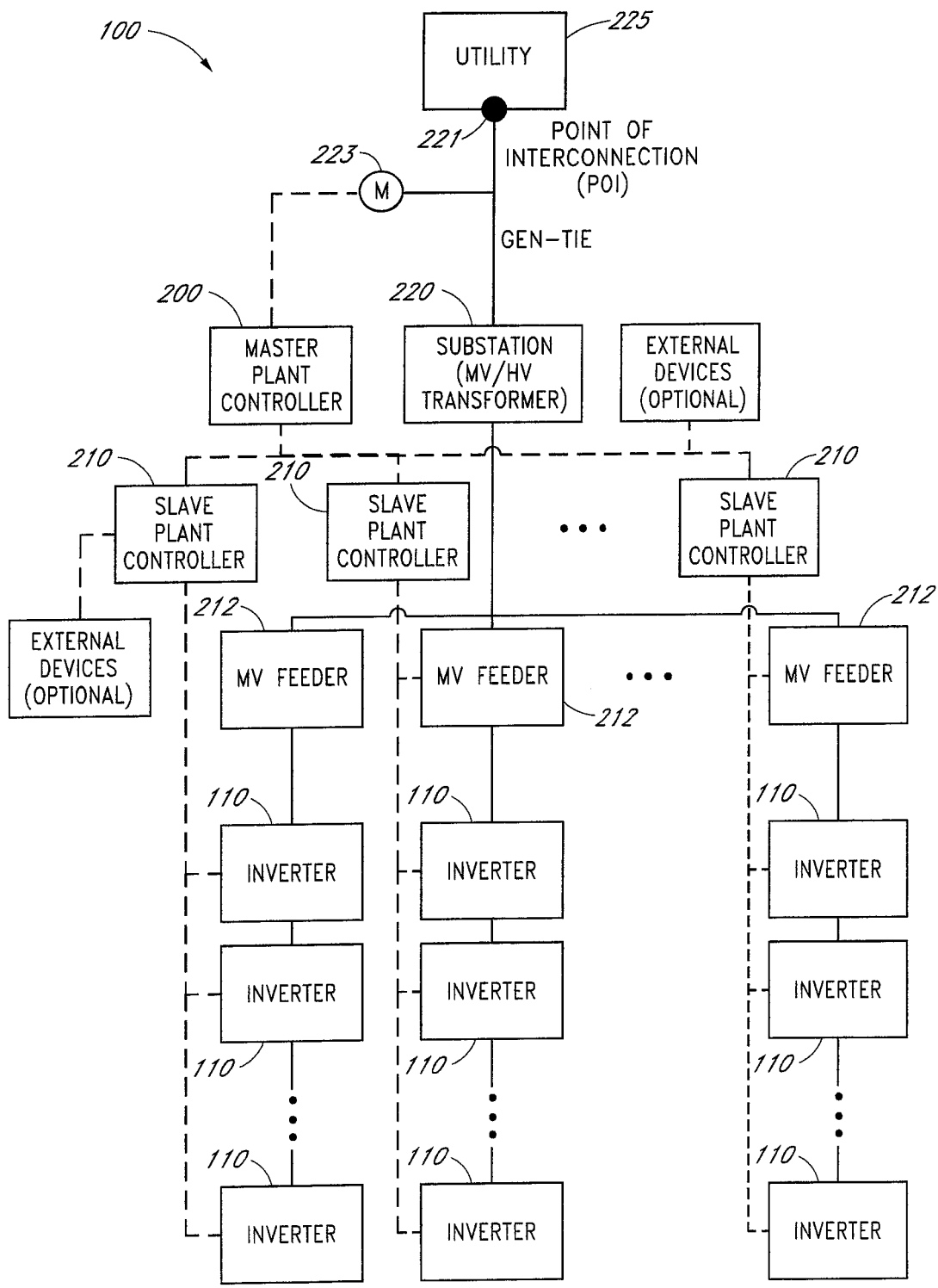
FIG. 2 schematically shows additional components of the photovoltaic power plant of FIG. 1 in accordance with an embodiment of the present invention.

FIG. 2 schematically shows additional components of the photovoltaic power plant 100 in accordance with an embodiment of the present invention. FIG. 2 shows the inverters 110 described in connection with FIG. 1. The solar panels 114 are not shown in FIG. 2 for clarity of illustration.

The photovoltaic power plant 100 is coupled to a utility power grid 225 at a point of interconnection (POI) 221. In the example of FIG. 2, the output of a group of photovoltaic inverters 110 are coupled to the POI 221 by way of a medium voltage (MV) feeder 212 to a substation MV/HV (medium voltage/high voltage) transformer 220. There are several groups of photovoltaic inverters 110 in the photovoltaic power plant 100, with each group of photovoltaic inverters 110 being connected to its own MV feeder 212 and controlled by its own plant controller 210. The photovoltaic power plant 100 may optionally include external devices, such as a capacitor bank controller, storage devices, etc.

The photovoltaic inverters 110 are typically located in inverter pads far from the POI 221 with the utility power grid 225. Due to the impedance of the AC collection system, the voltage and other outputs measured at terminals of a photovoltaic inverter 110 are not the same as at the POI 221. The operation of a plurality of photovoltaic inverters 110 also needs to be coordinated to meet output requirements at the POI 221.

A plant controller 210 may comprise a special-purpose or general-purpose processing device, such as a computer, configured to facilitate control of the photovoltaic power plant output (e.g., voltage) at or near the POI 221. In one embodiment, a plant controller 210 controls setpoints of corresponding photovoltaic inverters 110 to achieve a desired photovoltaic power plant output at the POI 221. More specifically, a plant controller 210 may be configured to adjust a setpoint of a photovoltaic inverter 110, the setpoint commanding the photovoltaic inverter 110 to generate a particular output value.

In the example of FIG. 2, the plant controllers 210 are "slave plant controllers" in that the plant controllers 210 are in turn controlled and coordinated by a master plant controller 200. In one embodiment, the master plant controller 200 issues a global setpoint based on the photovoltaic power plant output measured at the POI 221. Each slave plant controller 210 processes the global setpoint to generate an individual setpoint for each photovoltaic inverter 110 under its control. This way, the master plant controller 200 is able to control the photovoltaic inverters 110 to achieve a particular photovoltaic power plant output. As will be more apparent below, this master-slave photovoltaic power plant control architecture allows for many advantages including phased implementation, cost-sharing, and more effective control of the operation of the photovoltaic power plant.

The meter 223 may comprise a conventional electrical meter or other sensing element with data communication capability. The meter 223 may comprise an RMS transmitter, revenue meter, protective relays, and other measurement/sensing apparatus. In the example of FIG. 2, the meter 223 measures the output of the photovoltaic power plant 100 at the POI 221. This allows the meter 223 to have a more accurate reading of the photovoltaic power plant output compared to readings at the terminals of the photovoltaic inverters 110. Examples of photovoltaic power plant output measured by the meter 223 at the POI 221 include voltage, power factor, reactive power, and real power. In the example of FIG. 2, the solid lines represent electrical power flow and the dash lines represent data flow. The data flow may be in accordance with Supervisory Control and Data Acquisition (SCADA) control.

In the example of FIG. 2, the data flow in the photovoltaic power plant 100 is over a computer network. In one embodiment, the photovoltaic inverters 110, the slave plant controllers 210, the master plant controller 200, and the external devices communicate in accordance with the Modbus TCP/IP communications protocol. In that embodiment, Ethernet switches provide data communication links between components of the photovoltaic power plant 100. Monitoring and control may also be performed by another protocol like DNP3 or IEC 61850, or by analog signaling, such as by providing individual wiring for signals.

The master plant controller 200 may be a special-purpose or general-purpose computer configured to control the operation of the slave plant controllers 210. The master plant controller 200 coordinates the slave plant controllers 210 to operate the photovoltaic power plant 100 as a whole and meet plant level requirements at the POI 221. Based on inputs from the master plant controller 200, the slave plant controllers 210 send control signals to individual photovoltaic inverters 110 to adjust the photovoltaic power plant output at the POI 221 in accordance with, for example, automatic voltage regulation, power factor control, and/or real power control.

In one embodiment, the master plant controller 200 is configured to read from the meter 223 an output of the photovoltaic power plant 100, and to control the operation of the slave plant controllers 210 to adjust setpoints of corresponding photovoltaic inverters 110 based on the detected output of the photovoltaic power plant at the POI 221 to the utility power grid 225.

As an example operation of the photovoltaic power plant 100 for meeting the specific interconnection requirement of automatic voltage regulation (AVR), a collection of sensing elements will exist at the project substation control house, comprising sensing/measurement devices, such as an RMS Transmitter, Revenue Meter, Protective Relays, etc., to measure the grid conditions at the POI 221. The master plant controller 200 uses the measured values for various control algorithms as required per the interconnection requirements. In this automatic voltage regulation example, the master plant controller 200 determines the requirements for reactive power of the photovoltaic power plant 100, including inverters, cap banks, or other reactive power sources. Based on algorithmic logic, the master plant controller 200 communicates with the slave plant controllers 210 over the SCADA system. The slave plant controllers 210 take setpoints (e.g., global inverter setpoints and state machine requests and limits) from the master plant controller 200 and perform further algorithmic logic as necessary based on local project requirements, architecture, and configuration. Photovoltaic inverter 110 status, measurements, and communication status are collected and used in a slave plant controller's 210 algorithms. Based on this logic, the slave plant controller 210 issues reactive power export/absorb signals to the relevant photovoltaic inverters 110. Similarly, active curtailment can also be coordinated via the cascaded master/slave arrangement, as well as other strategic coordination related to the operation of the photovoltaic power plant 100.

Generally speaking, there are significant financial benefits of scale in developing and building large (e.g., greater than or equal to 20 MW) photovoltaic projects. However, there is a technical limitation on the number of devices, such as photovoltaic inverters, that a single plant controller can communicate with. Thus, for larger projects that capture economies of scale, a single plant controller is not an optimal solution. In addition, smaller (e.g., less than 20 MW) photovoltaic projects are typically more marketable than larger projects because of startup costs. Embodiments of the present invention allow for staged or phased implementation to overcome these issues.

Figure 3:
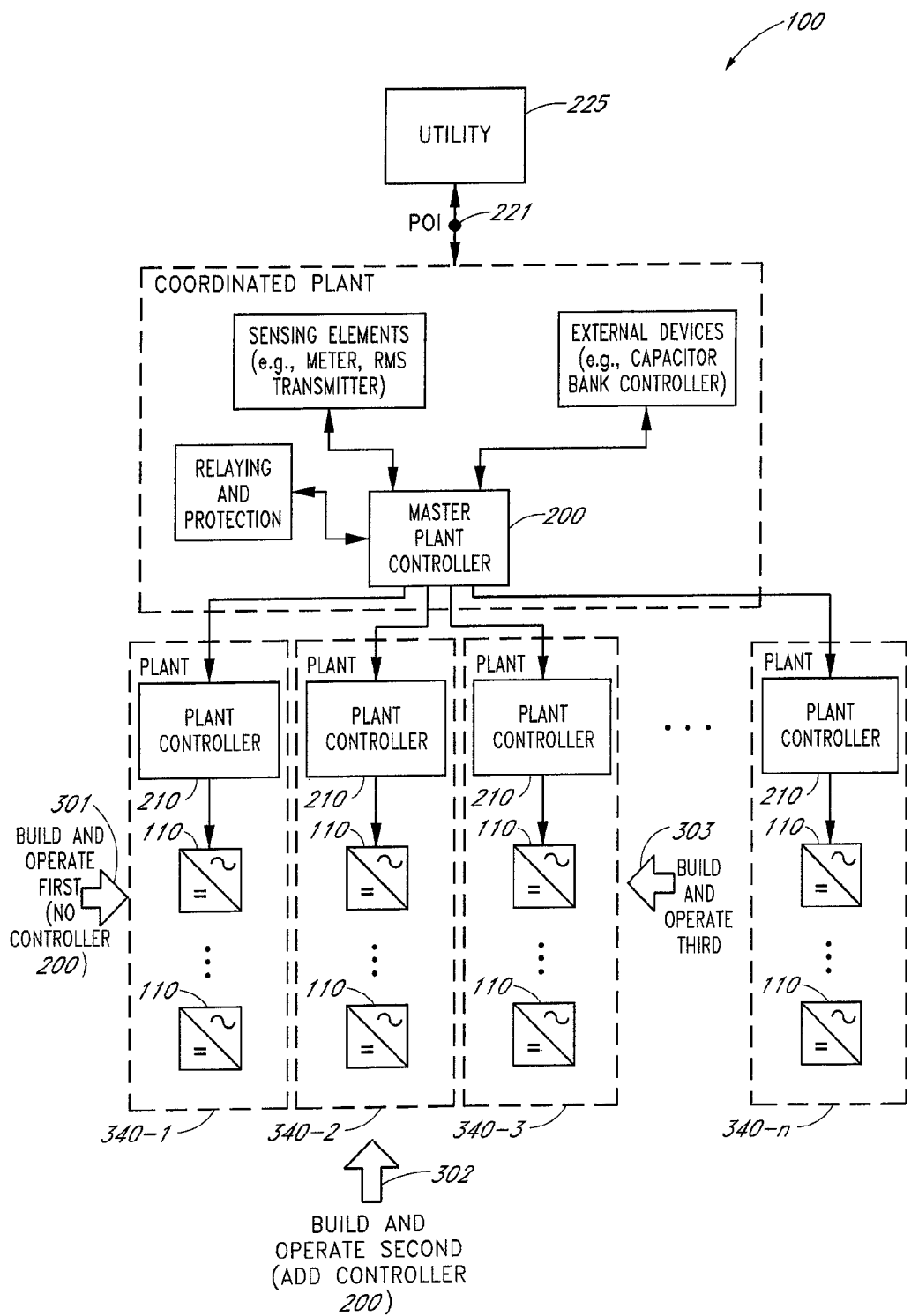
FIG. 3 schematically illustrates control of a photovoltaic power plant to allow for phased implementation in accordance with an embodiment of the present invention.

FIG. 3 schematically illustrates control of a photovoltaic power plant to allow for phased implementation in accordance with an embodiment of the present invention. In the example of FIG. 3, the photovoltaic power plant 100 is implemented in phases.

In a first phase (arrow 301), the photovoltaic power plant 100 may be implemented with a single power plant 340-1, having its own plant controller 210, photovoltaic inverters 110, and associated solar panels 114 (e.g., see FIG. 1). The power plants 340-2 and 340-3 and the master plant controller 200 are not installed in the first phase. Accordingly, in the first phase, the power plant 340-1 is operated to provide photovoltaic power plant output to the utility grid 225 at the POI 221 by itself along with associated sensing elements, external devices, and relaying and protection equipment. As can be appreciated, the project to build the photovoltaic power plant 100 in this first phase is relatively small, allowing more entities to afford the cost of the project.

After the completion of the first phase, e.g., after operating the photovoltaic power plant 100 for a year or more, a second phase (arrow 302) of implementation may be undertaken to add another power plant to the photovoltaic power plant 100. For example, after operating the photovoltaic power plant 100 for a period of time with only the power plant 340-1, the second phase may add the power plant 340-2 to the photovoltaic power plant 100. The second phase, like the first phase, may be a small project and thus easily funded. In the second phase, the master plant controller 200 is added to coordinate the operation of the plant controllers 210 of the power plants 340-1 and 340-2. That is, the plant controllers 210 of the power plants 340-1 and 340-2 are configured as slaves to the master plant controller 200 to provide the photovoltaic power plant output at the same POI 221 to the utility power grid 225. The phased implementation may continue to incorporate more power plants that provide photovoltaic power plant output to the same POI 221. As an example, after operating the photovoltaic power plant 100 for a period of time in the second phase configuration, the photovoltaic power plant 340-3 may be added to the photovoltaic power plant 100 in a third phase (arrow 303), with the plant controller 210 of the photovoltaic power plant 340-3 being configured as a slave to the master plant controller 200. Phased implementation may continue by subsequently adding successive photovoltaic power plant segments up to photovoltaic power plant 340-n to the photovoltaic power plant 100.

To make the phased implementation of the photovoltaic power plant 100 even more economically feasible, each of the power plants 340 (i.e., 340-1, 340-2, 340-3, . . . , 340-n) may be owned by separate entities. For example, the power plant 340-1 may be owned by a first power company, the power plant 340-2 may be owned by a second power company separate from and not associated with the first power company, and so on. Use of the master controller 200 to coordinate the operations of many different slave plant controllers 210 thus makes it easier to take advantage of the economies of scale of a large photovoltaic project by starting with and/or pooling the resources of separately owned smaller photovoltaic projects.

Figure 4A:
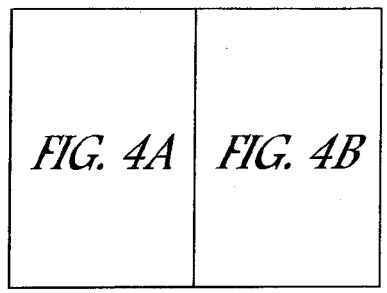
FIG. 4, which consists of FIGS. 4A and 4B, schematically shows further details and operation of the photovoltaic power plant of FIG. 1 in automatic voltage regulation control, in accordance with an embodiment of the present invention.
Figure 4A:
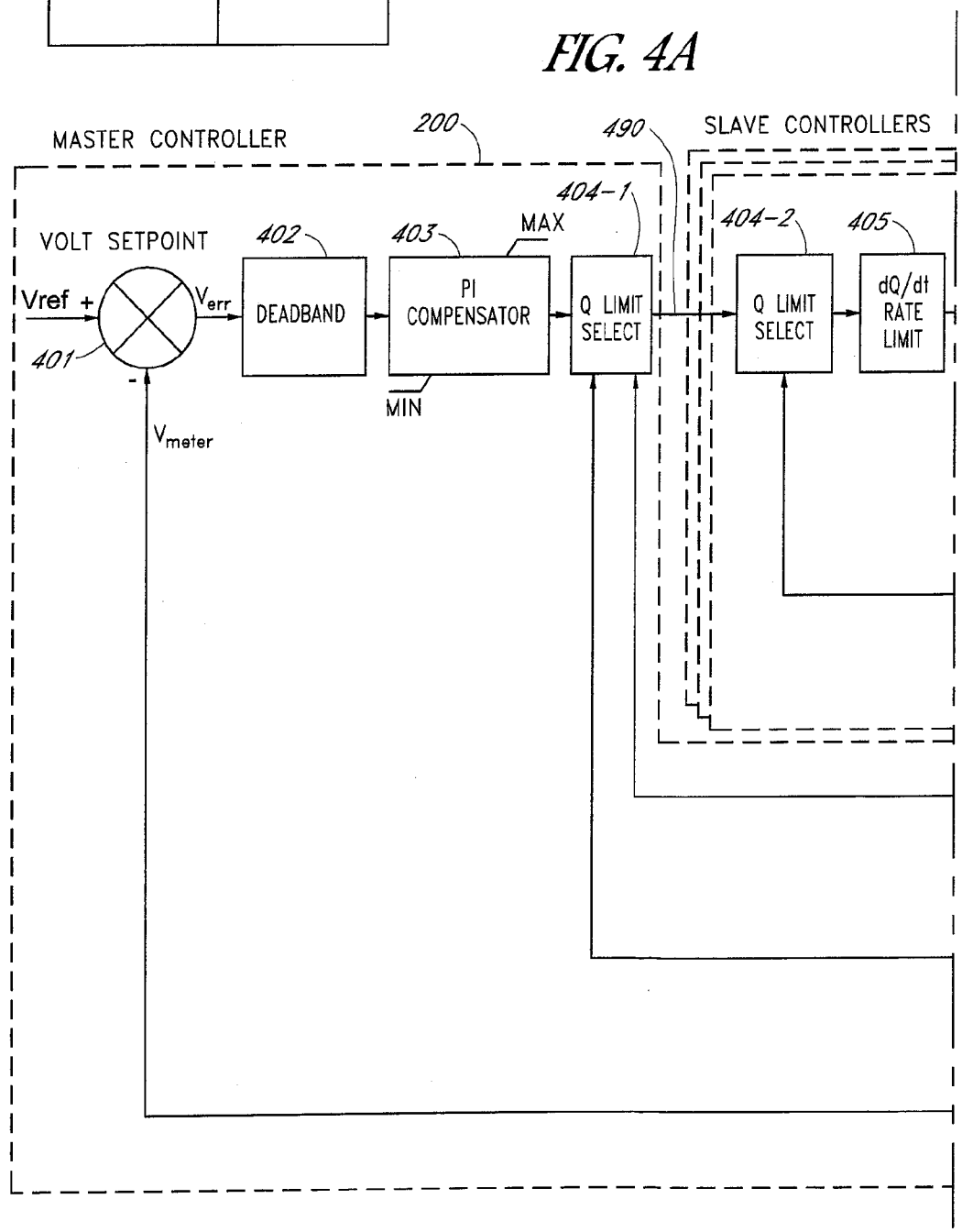
Figure 4B:
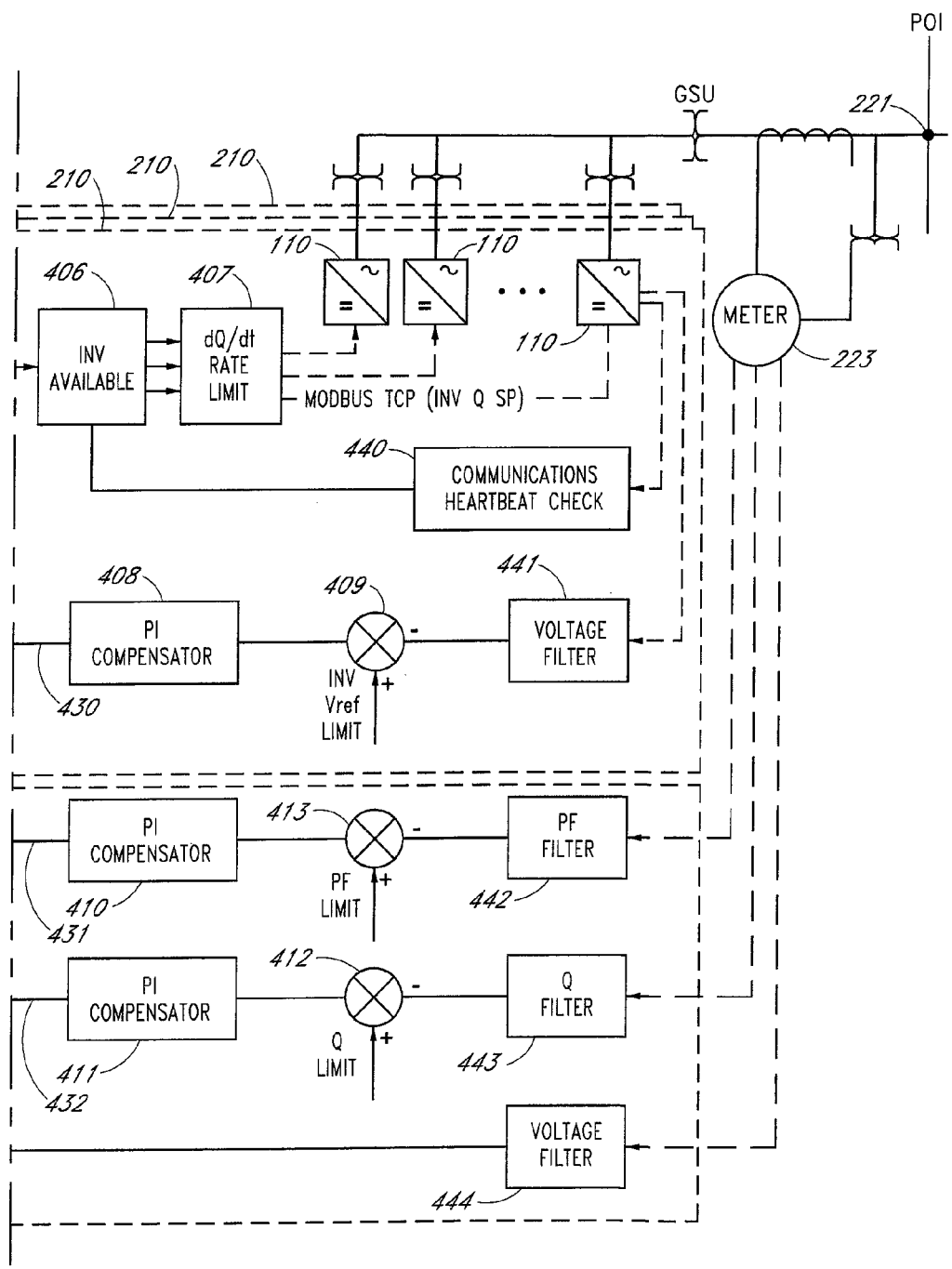

FIG. 4, which consists of FIGS. 4A and 4B, schematically shows further details and operation of the photovoltaic power plant 100 in automatic voltage regulation control, in accordance with an embodiment of the present invention.

In the example of FIG. 4, the master plant controller 200 includes the components 402, 403, 404-1, 410-413, and 442-444. The master plant controller 200 controls and coordinates the operation of a plurality of slave plant controllers 210. Each slave plant controller 210 includes the components 404-2, 405-409, and 440-441. Photovoltaic inverters 110 are depicted in FIG. 4 as being inside the perimeter of a slave plant controller 210 to indicate that each slave plant controller 210 controls the operation of a group of photovoltaic inverters 110, which are remotely located from the slave plant controller 210. The components of the master plant controller 200 and the slave plant controllers 210 may be implemented in hardware (e.g., electrical circuits), software (e.g., instructions and algorithms executed by a processor), or a combination of hardware and software. Components may be added or removed to meet the needs of a particular photovoltaic power plant.

In the example of FIG. 4, a global inverter reactive power setpoint is processed by the master plant controller 200 in function blocks 402, 403, and 404-1. The global inverter reactive power setpoint from the function block 404-1 is sent by the master plant controller 200 to individual slave plant controllers 210 (arrow 490). Each available slave plant controller 210 processes the global inverter reactive power setpoint in function blocks 404-2, 405, 406, and 407. The slave plant controller 210 generates individual reactive power setpoints, one for each photovoltaic inverter 110, in the function block 407. From the function block 407, an individual inverter reactive power setpoint signal is sent to each corresponding photovoltaic inverter 110. A photovoltaic inverter 110 exports and/or absorbs reactive power based on received individual inverter reactive power setpoint.

An example automatic voltage regulation operation is now explained with reference to FIG. 4. The master plant controller 200 receives a reference voltage $V_{REF}$ that is employed as a setpoint voltage for setting the voltage at the POI 221. A summer 401 generates an error signal $V_{ERR}$ based on the difference between the desired voltage at the POI 221 as indicated by the reference voltage $V_{REF}$ and the voltage at the POI 221 as measured by the meter 223 ($V_{METER}$). In the example of FIG. 4, the voltage at the POI 221 measured by the meter 223 is filtered by a voltage filter 444.

In one embodiment, the reference voltage $V_{REF}$ and the meter voltage reading $V_{METER}$ are processed in the master plant controller 200 as digital signals. These voltages may be converted to digital using an analog to digital converter (ADC), and then provided to the master plant controller 200 over a data communications network. As a particular example, the reference voltage $V_{REF}$ and the meter voltage reading $V_{METER}$ may be provided to the master plant controller 200 by way of ModbusTCP registers. Bounds checking may be performed on commands and inputs (including the reference voltage $V_{REF}$ and the meter voltage reading $V_{METER}$) received by the master plant controller 200.

The reference voltage $V_{REF}$, the meter voltage reading $V_{METER}$, and other voltages/currents in the photovoltaic power plant may be represented by other types of signals with appropriate changes to the rest of the photovoltaic power plant 100. For example, a voltage signal may be represented by a current signal, and vice versa. As another example, voltages and currents in the photovoltaic power plant may be represented in RMS (root mean square).

An unloading deadband function 402 may or may not be enabled depending on the application. The unloading deadband function 402 allows the error voltage $V_{ERR}$ to vary within a range without adjusting the global inverter reactive power setpoint. More specifically, the unloading deadband function 402 allows the input to the compensator 403 to vary up or down when the grid voltage (i.e., the voltage at the POI 221) is within bounds (typically ±1% of nominal), and keep the photovoltaic inverters 110 at a setting such that the photovoltaic inverters 110 export a unity power factor. In other words, if the grid voltage is within ±1%, for example, the input to the compensator 403 is actually just the grid voltage. This will also cause the photovoltaic inverters 110 to go to unity power factor if the grid voltage is within the deadband limits.

In one embodiment, the compensator 403 generates the global inverter reactive power setpoint signal from the error voltage $V_{ERR}$ using a proportional-integral (PI) control scheme. Other control schemes that may be used include proportional, integral, derivative, proportional-integral, integral-derivative, proportional-derivative, and proportional-integral-derivative. The PI compensator 403 may be absolute, which means the inverter reactive power setpoint is biased up or down based on the error signal $V_{ERR}$ and the proportional gain (Kp) and integral gain (Ki) of the PI compensator 403. The compensator 403 may also be incremental. The compensator 403 may have integral windup protection and saturation limits. The compensator 403 may be enabled or disabled due to state machine logic that is triggered when grid disturbances occur.

In the example of FIG. 4, the reactive power limit function is divided into a first reactive power limit function 404-1 in the master plant controller 200 and a second reactive power limit function 404-2 in each slave plant controller 210. A reactive power limit select function 404 (i.e., 404-1, 404-2) is configured to reduce or increase the global inverter reactive power setpoint output of the compensator 403.

In the master plant controller 200, the reactive power limit function 404-1 reduces or increases the global inverter reactive power setpoint based on inputs from the power factor limiter sub-loop 431 and reactive power limiter sub-loop 432. The reactive power limit select function 404-1 adjusts the global inverter reactive power setpoint such that the photovoltaic power plant output at the POI 221 does not exceed a power factor limit (PF limit) and a reactive power limit (Q limit).

The power factor limiter sub-loop 431 is configured to limit the global inverter reactive power setpoint when the power factor measured by the meter 223 at the POI 221 is close to, at, or over a power factor limit (PF Limit) of the photovoltaic power plant 100. The power factor reading from the meter 223 is filtered by a power factor filter 442 and compared to the power factor limit by a summer 413. The difference between the power factor reading from the meter 223 and the power factor limit is input to a compensator 410, which provides its output to the reactive power limit select function 404-1. The power factor limiter sub-loop 431 has its own compensator 410 because the power factor at the POI 221 is not necessarily the same as the power factor at the terminals of the photovoltaic inverters 110 due to impedance changes with real power flowing through the plant AC collection system. The compensator 410 may employ a PI or other control scheme.

The reactive power limiter sub-loop 432 is configured to limit the global inverter reactive power setpoint when the reactive power measured by the meter 223 at the POI 221 is close to, at, or over a reactive power limit (Q Limit) of the photovoltaic power plant 100. The reactive power reading from the meter 223 is filtered by a reactive power filter 443 and compared to the reactive power limit by a summer 412. The difference between the reactive power reading from the meter 223 and the reactive power limit is input to the compensator 411, which provides its output to the reactive power limit select function 404-1. The reactive power sub-loop 432 has its own compensator 411 because reactive power factor at the POI 221 is not necessarily the same as the reactive power at the terminals of the photovoltaic inverters 110 due to impedance changes with real power flowing through the plant AC collection system. The compensator 411 may employ a PI or other control scheme.

In each slave plant controller 210, a reactive power limit function 404-2 reduces or increases the global inverter reactive power setpoint based on input from an inverter voltage limiter sub-loop 430. The reactive power limit select function 404-2 adjusts the global inverter reactive power setpoint such that the photovoltaic power plant output at the POI 221 does not exceed an inverter reference voltage limit (INV $V_{REF}$ limit).

The inverter voltage limiter sub-loop 430 is configured to limit the global inverter reactive power setpoint based on the voltage output at the terminals of the photovoltaic inverters 110. In one embodiment, the terminal voltages of all the photovoltaic inverters 110 in a group controlled by a particular slave plant controller 210 are averaged together to generate a single inverter terminal voltage representing the terminal voltage of all the photovoltaic inverters 110 in that group. In another embodiment, the highest inverter terminal voltage among all the photovoltaic inverters 110 in the group controlled by a particular slave plant controller 210 is used to represent the terminal voltage of all the photovoltaic inverters 110 in that group. The inverter terminal voltage (averaged, highest, or other representation of terminal voltages of the photovoltaic inverters 110 in the group) is filtered by a voltage filter 441 and compared to the inverter reference voltage limit by a summer 409. The output of the summer 409 is input to the compensator 408, which provides its output to the reactive power limit select function 404-2. Unlike the power factor and reactive power sub-loops, the inverter voltage limiter sub-loop 430 gets its measurement directly from the photovoltaic inverters 110 (i.e., not from the meter 223). The compensator 408 may employ a PI or other control scheme.

In each slave plant controller 210, a reactive power rate of change limit function 405 limits the rate of change of the global inverter reactive power setpoint. This protects against rapid and drastic changes to the global inverter reactive power setpoint affecting the individual inverter reactive power setpoints.

In each slave plant controller 210, an inverter available function 406 periodically receives heartbeat signals 440 to detect photovoltaic inverter outages. Only one heartbeat signal 440 from one photovoltaic inverter 110 is shown in FIG. 4 for clarity of illustration. In practice, a separate heartbeat signal 440 is received from each photovoltaic inverter 110. For each available photovoltaic inverter 110, the inverter available function 406 outputs a corresponding individual inverter reactive power setpoint to an individual reactive power rate of change limit function 407.

In each slave plant controller 210, the individual reactive power rate of change limit function 407 is applied to each individual inverter reactive power setpoint that is provided to a corresponding photovoltaic inverter 110. As its name implies, the function 407 limits the rate of change of an individual inverter reactive power setpoint. In one embodiment, an individual inverter reactive power setpoint (Inv Q SP) is provided to a corresponding photovoltaic inverter 110 by way of a ModbusTCP register. An individual inverter reactive power setpoint is read from the register and converted to an analog voltage signal, which is then presented to a terminal of the photovoltaic inverter 110 at the inverter pad where the photovoltaic inverter 110 is located. The photovoltaic inverter 110 responds by adjusting its reactive power output in accordance with the received individual inverter reactive setpoint.

In one embodiment, the individual reactive power rate of change limit function 407 is also configured to ramp an individual inverter reactive power setpoint up or down in response to inverter outages. For example, if a photovoltaic inverter 110 is offline (e.g., missing a heartbeat), the function 407 may set the individual inverter reactive power setpoint for that photovoltaic inverter 110 to unity power factor or zero reactive power. When that photovoltaic inverter 110 goes back online, the function 407 may set the inverter reactive power setpoint for that photovoltaic inverter 110 back to the global reactive power setpoint as dictated by the automatic voltage regulation control.

Figure 5A:
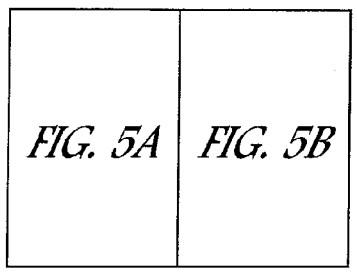
FIG. 5, which consists of FIGS. 5A and 5B, schematically shows further details and operation of the photovoltaic power plant of FIG. 1 in power factor control, in accordance with an embodiment of the present invention.
Figure 5A:
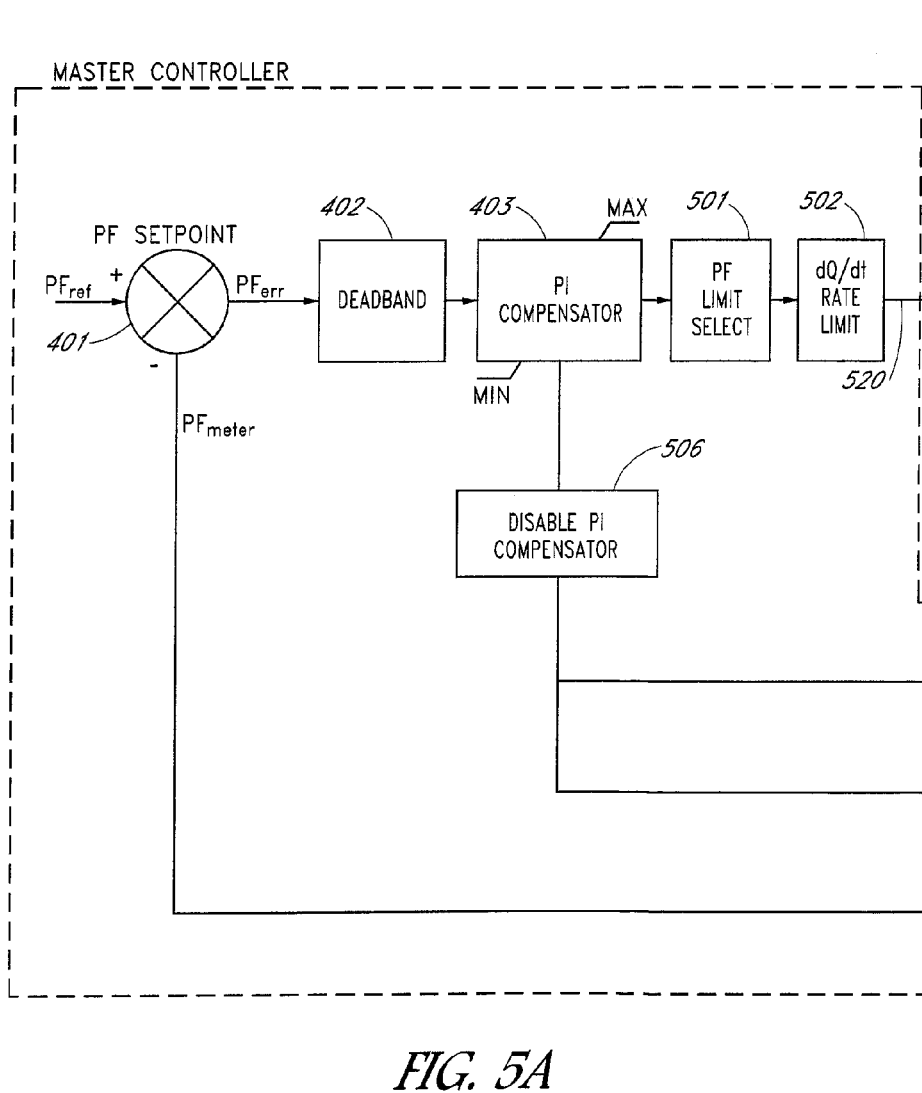
Figure 5B:
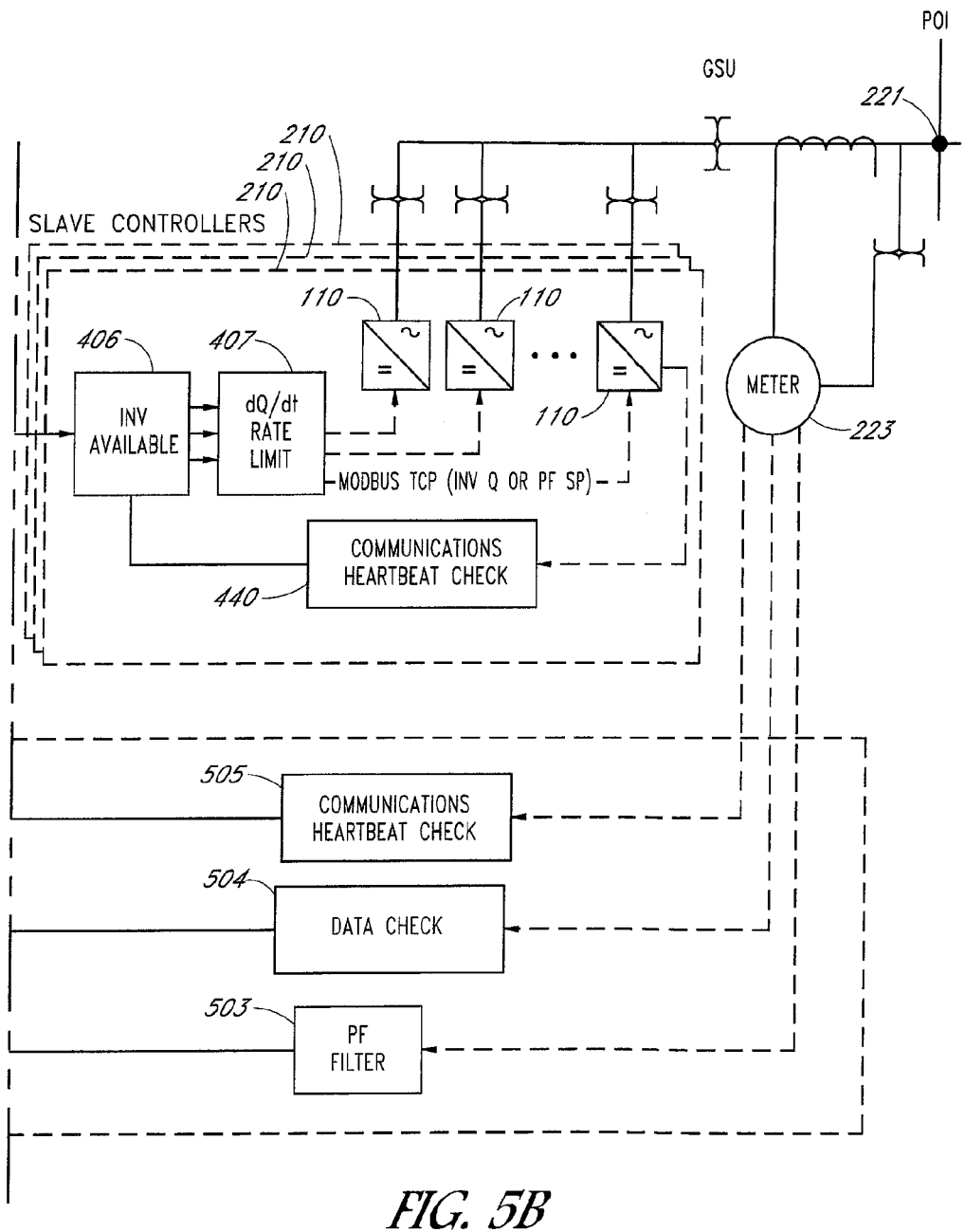

FIG. 5, which consists of FIGS. 5A and 5B, schematically shows further details and operation of the photovoltaic power plant 100 in power factor control (PFC), in accordance with an embodiment of the present invention. Generally speaking, power factor control is similar to automatic voltage regulation except that the power factor, instead of voltage, output of the photovoltaic power plant 100 is used as the main control variable in controlling the operation of the photovoltaic power plant 100.

In the example of FIG. 5, the master plant controller 200 includes the components 402, 403, and 501-506. The master plant controller 200 controls and coordinates the operation of a plurality of slave plant controllers 210. Each slave plant controller 210 includes the components 406 and 407. Photovoltaic inverters 110 are depicted in FIG. 5 as being inside the perimeter of a slave plant controller 210 to indicate that each slave plant controller 210 controls the operation of a group of photovoltaic inverters 110, which are remotely located from the slave plant controller 210. Components may be added or removed to meet the needs of a particular photovoltaic power plant.

In the example of FIG. 5, a global inverter reactive power setpoint signal is processed by the master plant controller 200 in function blocks 402, 403, 501, and 502. The global inverter reactive power setpoint from the function block 502 is sent by the master plant controller 200 to individual slave plant controllers 210 (arrow 520). A particular slave plant controller 210 receives the global inverter reactive power setpoint in function block 406, which generates individual reactive power setpoints, one for each photovoltaic inverter 110. From the function block 406, an individual inverter reactive power setpoint signal is sent to each corresponding photovoltaic inverter 110. A photovoltaic inverter 110 exports and/or absorbs reactive power based on received individual inverter reactive power setpoint.

An example power factor control operation is now explained with reference to FIG. 5. The master plant controller 200 receives a reference power factor $PF_{REF}$ that represents a desired power factor at the POI 221. The summer 401 generates an error signal $PF_{ERR}$ based on the difference between the desired power factor at the POI 221 as indicated by the reference power factor $PF_{REF}$ and the power factor at the POI 221 as measured by the meter 223 ($PF_{METER}$). In this example, the power factor $PF_{METER}$ represents the power factor at the POI 221. The power factor reading at the POI 221 may be filtered by a power factor filter 503 before being presented to the summer 401.

An unloading deadband function 402 may or may not be enabled depending on the application. As before, the unloading deadband function 402 allows the error power factor $PF_{ERR}$ to vary within a range without adjusting the global inverter reactive power setpoint. The compensator 403 generates the global inverter reactive power setpoint or global power factor setpoint signal from the error power factor $PF_{ERR}$ using a PI, or other, control scheme. The compensator 403 may be disabled (see 506) when the meter 223 stops functioning as indicated by a missing communications heartbeat signal 505 or gives erroneous readings as indicated by a data check 504.

In the example of FIG. 5, a reactive power limit select function 501 is configured to reduce or increase the global inverter reactive power setpoint output of the compensator 403. In one embodiment, the reactive power limit select function 501 adjusts the global inverter reactive power setpoint such that the photovoltaic power plant output at the POI 221 does not exceed the power factor limit of the photovoltaic power plant 100. A reactive power rate of change limit function 502 limits the rate of change of the global inverter reactive power setpoint. This protects against rapid and drastic changes to the global inverter reactive power setpoint affecting the individual inverter reactive power setpoints.

In each slave plant controller 210, the inverter available function 406 periodically receives heartbeat signals 440 to detect photovoltaic inverter outages. Only one heartbeat signal 440 from one photovoltaic inverter 110 is shown in FIG. 5 for clarity of illustration. In practice, a separate heartbeat signal 440 is received from each photovoltaic inverter 110. For each available photovoltaic inverter 110, the inverter available function 406 outputs a corresponding individual inverter reactive power setpoint to an individual reactive power rate of change limit function 407, which limits the rate of change of individual inverter reactive power setpoints.

In each slave plant controller 210, the individual reactive power rate of change limit function 407 is applied to each individual inverter reactive power setpoint that is provided to a corresponding photovoltaic inverter 110. In one embodiment, an individual inverter reactive power setpoint (Inv Q SP) is provided to a corresponding photovoltaic inverter 110 by way of a ModbusTCP register. An individual inverter reactive power setpoint is read from the register and converted to an analog voltage signal, which is then presented to a terminal of the photovoltaic inverter 110 at the inverter pad where the photovoltaic inverter 110 is located. The photovoltaic inverter 110 responds by adjusting its reactive power output in accordance with the received individual inverter reactive setpoint to achieve the desired power factor at the POI 221. Alternatively, instead of providing a reactive power setpoint to the inverter, the slave plant controller 210, may issue a power factor setpoint command to the inverter 110.

As can be appreciated from the foregoing, embodiments of the invention may also be employed for real power control in a manner similar to the control schemes described above. Generally speaking, real power control is similar to automatic voltage regulation or power factor control except that the real power output of the photovoltaic power plant 100 is used as the main control variable in controlling the operation of the photovoltaic power plant 100. More particularly, in one embodiment, the photovoltaic power plant output at the POI 221 comprises real power, and the slave plant controllers 210 adjust an inverter real power setpoint of corresponding inverters 110 in accordance with real power control. In that embodiment, the master plant controller 200 receives a real power reading at the POI 221 from the meter 223, compares the real power reading to the desired real power, and processes the differences between the real power reading at the POI 221 to the desired real power to generate and send a global inverter real power setpoint to the slave plant controllers 210, which generate individual inverter real power setpoints for corresponding inverters 110. Embodiments of the present invention may also be employed for other photovoltaic power plant control schemes without detracting from the merits of the present invention.

Master-slave architectures for controlling operation of photovoltaic power plants have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A photovoltaic power plant comprising:
a plurality of slave plant controllers configured to receive a global setpoint from a master plant controller, each slave plant controller in the plurality of slave plant controllers being configured to reduce or increase the global setpoint to adjust an individual setpoint of each of a plurality of photovoltaic inverters controlled by the slave plant controller, the individual setpoint setting an output of a corresponding photovoltaic inverter in the plurality of photovoltaic inverters provided to a point of interconnection (POI) of the photovoltaic power plant to a utility power grid, each of the plurality of photovoltaic inverters being configured to convert direct current generated by a plurality of solar cells to alternating current; and
the master plant controller controlling operation of the plurality of slave plant controllers, the master plant controller being configured to detect an output of the photovoltaic power plant at the POI to the utility power grid, and to control operation of the plurality of slave plant controllers to adjust individual setpoints of corresponding photovoltaic inverters based on the detected output of the photovoltaic power plant at the POI to the utility power grid by providing the global setpoint to the plurality of slave plant controllers.

2. The photovoltaic power plant of claim 1 wherein the detected output of the photovoltaic power plant at the POI comprises reactive power and the individual setpoint adjusted by each slave plant controller in the plurality of slave plant controllers comprises an inverter reactive power setpoint.

3. The photovoltaic power plant of claim 1 wherein the detected output of the photovoltaic power plant at the POI comprises power factor and the individual setpoint adjusted by each slave plant controller in the plurality of slave plant controllers comprises an inverter power factor setpoint.

4. The photovoltaic power plant of claim 1 wherein the detected output of the photovoltaic power plant at the POI comprises real power and the individual setpoint adjusted by each slave plant controller in the plurality of slave plant controllers comprises an inverter real power setpoint.

5. The photovoltaic power plant of claim 1 wherein the detected output of the photovoltaic power plant at the POI comprises measured output voltage.

6. The photovoltaic power plant of claim 1 wherein the master plant controller reads a meter at the POI to detect the output of the photovoltaic power plant at the POI.

7. The photovoltaic power plant of claim 1 wherein the master plant controller includes a compensator configured to receive and process the detected output of the photovoltaic power plant.

8. The photovoltaic power plant of claim 7 wherein the compensator comprises a proportional-integral (PI) compensator.

9. The photovoltaic power plant of claim 1 wherein the plurality of solar cells comprises backside contact solar cells.

10. A method of controlling operation of a photovoltaic power plant, the method comprising:
controlling operation of a first plurality of photovoltaic inverters using a first slave plant controller, the first slave plant controller receiving a global setpoint from a master plant controller and reducing or increasing the global setpoint to adjust an individual setpoint of each photovoltaic inverter in the first plurality of photovoltaic inverters to adjust an output of each photovoltaic inverter in the first plurality of photovoltaic inverters, each photovoltaic inverter in the first plurality of photovoltaic inverters converting direct current generated by a first plurality of solar cells to alternating current for delivery to a point of interconnection (POI) of the photovoltaic power plant to a utility power grid;

controlling operation of a second plurality of photovoltaic inverters using a second slave plant controller, the second slave plant controller receiving the global setpoint from the master plant controller and reducing or increasing the global setpoint to adjust an individual setpoint of each photovoltaic inverter in the second plurality of photovoltaic inverters to adjust an output of each photovoltaic inverter in the second plurality of photovoltaic inverters, each photovoltaic inverter in the second plurality of photovoltaic inverters converting direct current generated by a second plurality of solar cells to alternating current for delivery to the POI;

measuring an output of the photovoltaic power plant at the POI; and controlling operation of the first and second slave plant controllers using the master plant controller, the master plant controller controlling the first and second slave plant controllers to adjust individual setpoints of photovoltaic inverters in the first and second pluralities of photovoltaic inverters based on the output of the photovoltaic power plant measured at the POI by providing the global setpoint to the first and second slave plant controllers.

11. The method of claim 10 wherein the output of the photovoltaic power plant measured at the POI comprises voltage output.

12. The method of claim 11 wherein the photovoltaic power plant is operated in accordance with automatic voltage regulation.

13. The method of claim 10 wherein the output of the photovoltaic power plant measured at the POI comprises power factor.

14. The method of claim 13 wherein the photovoltaic power plant is operated in accordance with power factor control.

15. The method of claim 10 wherein the output of the photovoltaic power plant measured at the POI comprises real power.

16. The method of claim 10 wherein the first slave plant controller communicates with the first plurality of photovoltaic inverters over a data communication network.

17. A method of controlling operation of a photovoltaic power plant, the method comprising:

installing a first plant controller of a photovoltaic power plant, the first plant controller being configured to control operation of a first plurality of photovoltaic inverters that convert direct current generated by a first plurality of solar cells to alternating current;

operating the first plant controller to generate an output of the photovoltaic power plant at a point of interconnection (POI) to a utility power grid;

after the first plant controller has been operating to generate the output of the photovoltaic power plant at the POI to the utility power grid for at least a period of time, installing a second plant controller of the photovoltaic power plant, the second plant controller being configured to control operation of a second plurality of photovoltaic inverters that convert direct current generated by a second plurality of solar cells to alternating current;

installing a master plant controller to control operation of the first and second plant controllers; and controlling operation of the first and second plant controllers using the master plant controller, the master plant controller controlling the first and second plant controllers to adjust individual setpoints of photovoltaic inverters in the first and second pluralities of photovoltaic inverters based on a measured output of the photovoltaic power plant at the POI by providing a global setpoint to the first and second plant controllers, wherein the first and second plant controllers reduce or increase the global setpoint to adjust the individual setpoints of photovoltaic inverters in the first and second pluralities of photovoltaic inverters.

18. The method of claim 17 wherein the measured output of the photovoltaic power plant at the POI comprises voltage.

19. The method of claim 17 wherein the photovoltaic power plant is operated in accordance with automatic voltage regulation.

20. The method of claim 17 wherein the measured output of the photovoltaic power plant measured at the POI comprises power factor.

21. The method of claim 17 wherein the photovoltaic power plant is operated in accordance with power factor control.

22. The method of claim 17 wherein the measured output of the photovoltaic power plant measured at the POI comprises real power.

23. The method of claim 17 wherein the photovoltaic power plant is operated in accordance with automatic real power control.

24. The method of claim 17 wherein the first plant controller communicates with the first plurality of photovoltaic inverters over a data communication network.

25. The method of claim 17 wherein the first and second plant controllers are operated in separate photovoltaic plants operated by separate entities.

* * * * *